Figure 1:
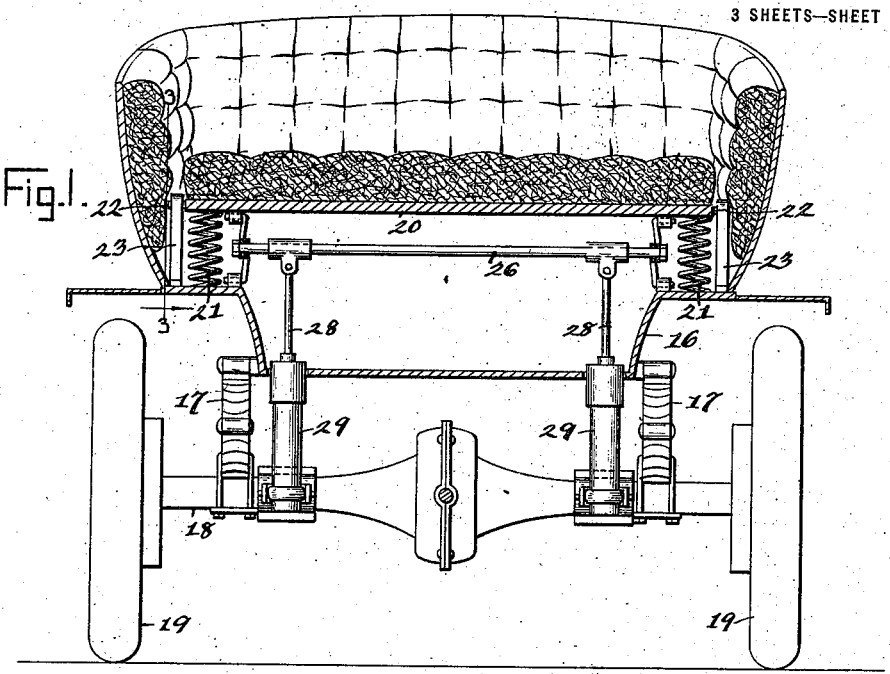

M. G. ADAMS.
SEAT SPRING.
APPLICATION FILED DEC. 10, 1914.

1,171,297.

Patented Feb. 8, 1916.
3 SHEETS—SHEET 1.

WITNESSES:

INVENTOR
Malcolm G. Adams
BY
ATTORNEYS

M. G. ADAMS.
SEAT SPRING.
APPLICATION FILED DEC. 10, 1914.
1,171,297.
Patented Feb. 8, 1916.
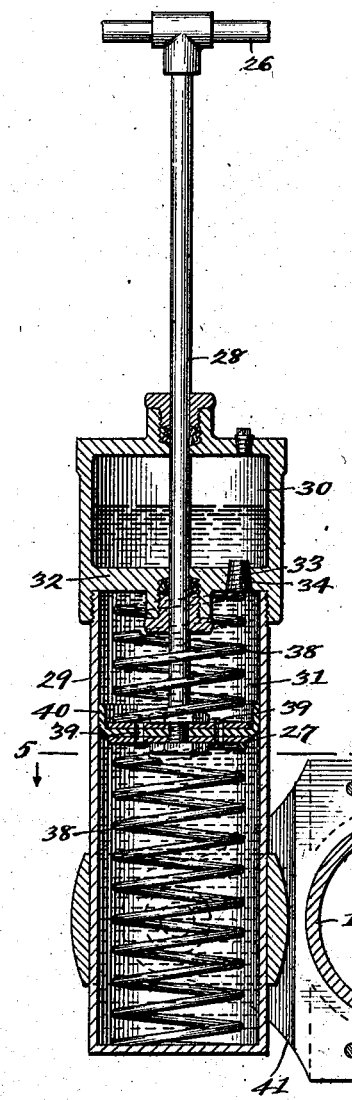
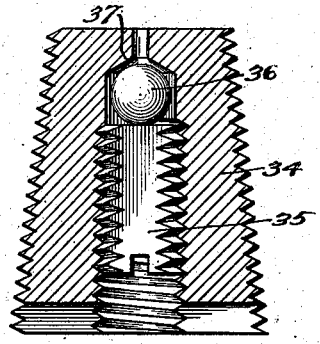
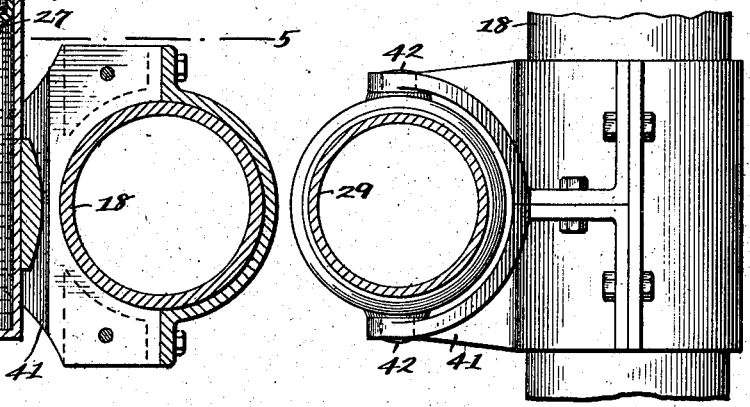
WITNESSES:
INVENTOR
Malcolm G. Adams
BY
ATTORNEYS M. G. ADAMS.
SEAT SPRING.
APPLICATION FILED DEC. 10, 1914.
1,171,297.
Patented Feb. 8, 1916.
3 SHEETS—SHEET 3.
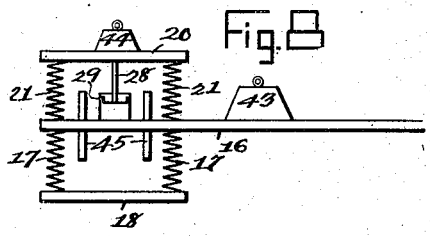
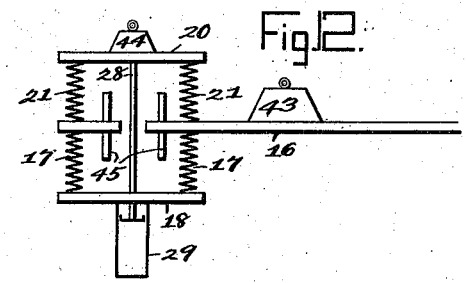
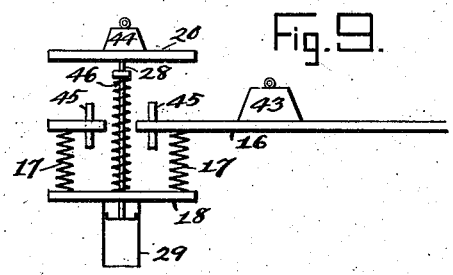
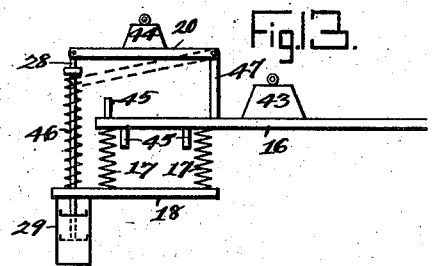
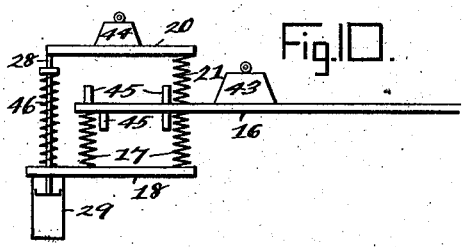
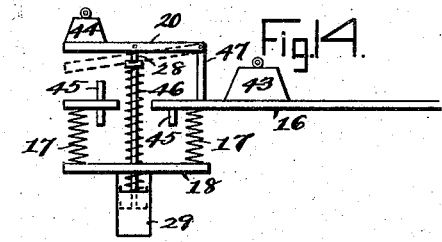
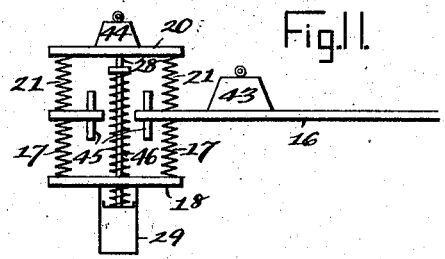
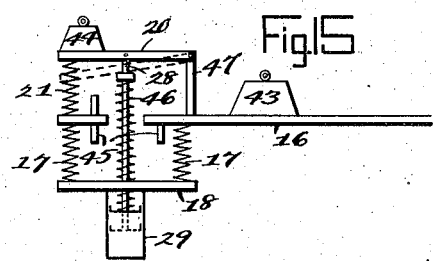
WITNESSES:
C. K. Reichenbach
J. E. Larsen
INVENTOR
Malcolm G. Adams
BY Munn Co
ATTORNEYS

UNITED STATES PATENT OFFICE.

MALCOLM GROVER ADAMS, OF HAMLET, NORTH CAROLINA.

SEAT-SPRING.

1,171,297.  Specification of Letters Patent.  Patented Feb. 8, 1916.

Application filed December 10, 1914. Serial No. 876,426.

*To all whom it may concern:*

Be it known that I, MALCOLM G. ADAMS, a citizen of the United States, and a resident of Hamlet, in the county of Richmond and State of North Carolina, have invented certain new and useful Improvements in Seat-Springs, of which the following is a specification.

My invention relates to the suspension of vehicle seats, more especially the rear seats of automobiles, and one of the main objects thereof is to provide means for insuring a practical stability of such seats with respect to the body and running gear of such vehicles, thereby providing a maximum of easy riding quality for passengers, and enhancing the enjoyment of riding.

A further object is to provide means for accomplishing this result which prevents the rebound of a seat usual to such vehicles when running over rough ground, or over stones, hillocks, etc., in the roadway; and a further object is to provide means of a resilient character between the seat and vehicle axle, either directly or indirectly, whereby the entire weight of the vehicle body and seat, as well as of the passengers, does not bear upon the conventional body springs; thus permitting vertical movement of the vehicle body and seat independent of each other and also compensating for unequal weights of passengers at different times.

My invention is fully described in the following specification, of which the accompanying drawings form a part, in which like reference characters are used to designate like parts in each of the views, and in which :—

Figure 2:
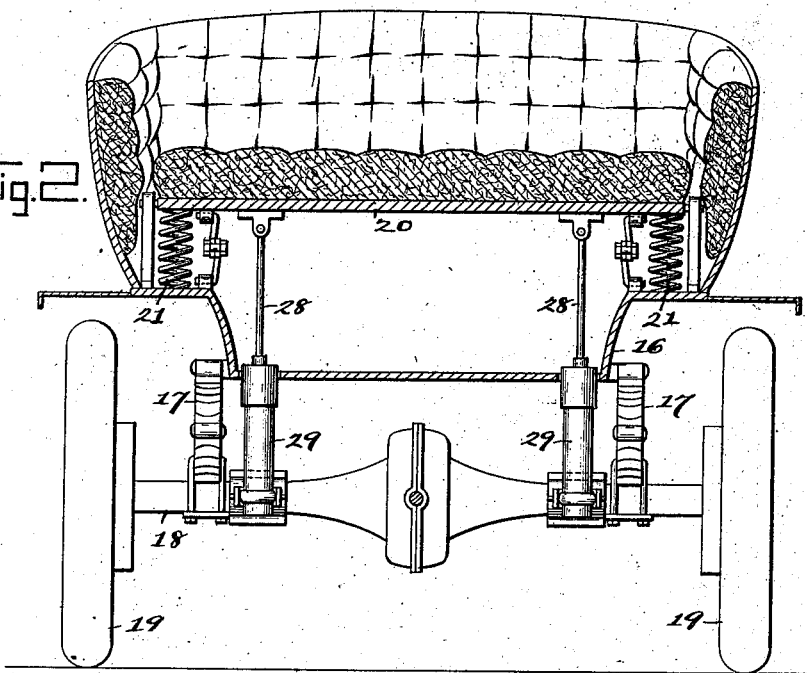
Figure 3:
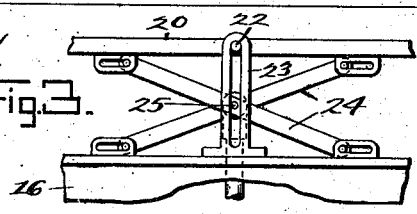

Figure 1 is a transverse, vertical, section taken through an automobile provided with one form of my seat suspension means; Fig. 2 is a similar view but showing a modification therover; Fig. 3 is a fragmentary section taken on the line 3—3 of Fig. 1; Fig. 4 is a central, vertical, section taken through a present preferred form of recoil take-up which I employ; Fig. 5 is a section taken on the line 5—5 of Fig. 4; Fig. 6 is a detached, sectional view of a detail of said take-up; Fig. 7 is a top plan view of a detail of Fig. 6; and Figs. 8 to 15, inclusive, are diagrammatic views of several of the many methods of putting my invention into use.

In Figs. 1 and 2 of the drawings I have shown a portion of an automobile body 16 carried by the conventional springs 17 on a rear axle 18 having the usual wheels 19 connected therewith, and I also show a seat 20 normally supported by springs 21 at the ends thereof and guided, in its vertical movement, by means of anti-frictional pintles 22 slidable in vertically arranged guides 23; I also employ, as shown in Fig. 3, toggle-levers 24 joined at 25 to maintain the seat, at each end, in parallelism with its support, 16, although I may dispense therewith in several of the methods of putting my invention into practice, as hereafter explained. Said toggle-levers may be joined, at each end of the seat, by means of a corresponding end of a rod 26, Fig. 1, which is in pivotal connection with two pistons 27, Fig. 4, by means of corresponding rods 28, said pistons being vertically movable in their respective cylinders 29 in operative connection with the axle 18; each of said cylinders contains, preferably, two compartments 30 and 31 separated by a horizontal partition 32 through which the piston-rod 28 passes and which is provided with a port 33 having a taper-plug 34 threaded thereinto and which is provided with a longitudinal bore therethrough threaded to hold an adjustable plug 35 which impressions a ball 36 between itself and a ball-valve seat 37, the plug 35 being cut away on one side, as shown in Fig. 7, to provide a permanent passage through the taper-plug 34; I also provide coil springs 38 for the piston 27, on each side thereof, and form a plurality of minute ports 39 through the piston to permit the oil, which completely fills the compartment 31 and partially fills the compartment 30, to pass slowly through the piston.

In view of the normal unseated position of the ball-valve and the permanent passage through the taper-plug, oil is free to pass downwardly into the compartment 31 to keep the same filled but, upon upward movement of the piston, the ball-valve is seated, and the oil cannot pass to the compartment 30, as will be seen, thus forming a dash-pot. The rod 26 thus forms an equalizing means for the ends of the seat, but I may, as shown in Fig. 2, dispense with the same and connect the piston-rods 28 directly with the under side of said seat, the construction and operation being alike otherwise in these two forms.

The piston 27 has a flexible cup-valve 40 thereon which permits free downward movement of said piston but resists upward movement thereof, and, when the vehicle strikes an uneven and abrupt portion of the road and the axle moves quickly upward, the seat is not affected thereby because of the free piston movement, but, when the conventional springs 17 rebound and tend to force the body 16 upwardly, the seat is not affected because of the resisted piston movement upwardly of its cylinder, said pistons moving only so fast as the oil is permitted to pass through the ports 39, and a gradual return to normal relationship between the seat and axle follows, through the springs 21 and 38, irrespective of the movement of the body 16, or practically so. It will thus be seen that the jar of the upward movement of the axle is avoided upon the seat, and the downward movement thereof, as well as the rebound of the body 16, is taken resiliently by the said springs until the normal relationship between body, seat, and axle, is resumed, thereby resulting in great comfort in riding, and the dash-pots also act as shock-absorbers for the automobile to prevent the very great rebound strain on the conventional springs 17 and which frequently causes a break therein or thereof.

As shown in Figs. 4 and 5, I prefer to provide an articulating joint between the axle 18 and the cylinder 29 by means of a yoke 41 and pivots 42 shown in said figures, but I do not limit myself to any specific form of connection in view of the many different methods of suspending the seat, within the scope of my invention.

In the diagrammatic views, 8 to 15, I have shown the body load at 43, the seat load at 44, and stops 45 to limit the relative movement of the parts; Fig. 8 is similar to that already described with the difference that the dash-pots 29 are connected with the body instead of with the axle; in this method, when the vehicle passes over a road inequality, the springs 17 first collapse, and afterward the springs 21, and, thereafter, the springs 17 first again expand and thereafter the springs 21 but at a speed depending upon the return of the pistons in the dash-pots to normal positions, and the seat remains practically in the same horizontal plane, unaffected by the axle or body movements. Fig. 9 represents a departure in that the springs 21 are eliminated, and the springs 46 used on the piston-rods, between the axle and seat, instead, and the body movement has no effect whatever on the seat, and the axle very little to move it from its normal horizontal plane. Fig. 10 shows a combination of Figs. 8 and 9, the front of the seat being supported by the springs 21 and the rear by the springs 46. Fig. 11 shows a combination of 8 and 9, the seat being supported front and rear by the springs 21 and centrally by the springs 46. Fig. 12 shows the form shown in Fig. 11 but with the springs 46 omitted, this being the same as in Figs. 1 and 2. Fig. 13 shows a modification in that a rigid support 47 is employed for the front edge of the seat and to which it is pivoted, the structure otherwise being similar to the form shown in Fig. 10. Fig. 14 shows a combination of the forms shown in Figs. 9 and 13, the support 47 being employed. Fig. 15 shows a combination of the forms shown in Figs. 11 and 13, the support 47 being substituted for the front edge springs 21. The effect of all of these forms is substantially the same although it varies in degree in the several forms, and many other modifications thereover will suggest themselves to meet varying conditions of body load, seat load, and road conditions, the result attained in all the forms being to maintain the seat in approximate parallelism with the surface of the road over which the vehicle is moving, in a general way, with very little if any effect on said seat by the vertical movement of the axle or body because of road inequalities; while the forward edges of the forms where the seats are pivoted will be affected by the movement of the body, the rear edges are so freely movable independently of the body as to produce the desired result.

It will thus be seen that, by means of my invention, the upward axle movement does not affect the seat in view of the compression of the interposed springs, either directly or indirectly, this axle movement being very rapid; in the downward axle movement the seat has a tendency to follow the same because of the resisted piston movement in the dash-pots, but the springs interposed between the axle and seat, directly or indirectly, counteract this tendency to a material extent but, because of the dash-pots, said springs cannot cause the seat to fly upward in the tendency of said springs to rebound after compression, and an approximately constant relationship between the seat and axle results, with the body balancing itself therebetween; while I state that an approximately constant axle and seat obtains, I use this term to refer to the mean plane of the axle, and not to the movements above or under the mean plane due to stones or other road inequalities of abrupt and briefly lasting effect on the axle.

Concisely, my invention consists in interposing resilient supports between the axle and seat, directly or indirectly, and a device for yieldingly resisting movement of the axle and seat from each other, and, with a reservation to myself of such changes in and modifications of the forms shown and described as properly come within the scope of the following claims, What I do claim as new, and desire to secure by Letters Patent, is:—

1. The combination in a vehicle, of a body, an axle, resilient devices interposed therebetween, a seat, devices interposed between said axle and seat of a resilient character, and means for yieldingly resisting movement of said seat with respect to said axle in one direction.

2. The combination in a vehicle, of a body, an axle, resilient means interposed therebetween, a seat, resilient means interposed between said axle and seat permitting their movement toward each other, and means for yieldingly resisting movement of said axle and seat from each other.

3. The combination in a vehicle, of a body, an axle, resilient means interposed therebetween, a seat, resilient means interposed between said axle and seat, permitting their movement toward each other, stops for limiting such movement, and means for yieldingly resisting movement of said axle and seat from each other.

4. The combination in a vehicle, of a body, an axle, resilient means interposed therebetween, a seat, resilient means interposed between said body and seat, permitting movement toward each other, and means in operative connection with said axle and seat for yieldingly resisting movement of said axle and seat from each other.

5. The combination in a vehicle, of a body, an axle, resilient means interposed therebetween, a seat, a pivotal support between said body and seat, resilient means interposed between said body and seat, permitting their movement toward each other, and means in operative connection with said axle and seat for yieldingly resisting movement of said axle and seat from each other.

6. The combination in a vehicle, of a body, an axle, resilient means interposed therebetween, a seat, a pivotal support between body and seat, resilient means interposed between said axle and seat, and means for yieldingly resisting movement of said axle and seat from each other.

7. The combination in a vehicle, of a body, an axle, resilient means interposed therebetween, a seat, resilient means interposed between said body and seat, resilient means interposed between said axle and seat, and means for yieldingly resisting movement of said axle and seat from each other.

In testimony whereof I have signed my name to this specification in the presence of two subscribing witnesses.

MALCOLM GROVER ADAMS.

Witnesses:
  EDWARD H. FULLER,
  THOS. G. BAGWELL.

Copies of this patent may be obtained for five cents each, by addressing the "Commissioner of Patents, Washington, D. C."